United States Patent
Wong et al.

(10) Patent No.: US 8,903,185 B2
(45) Date of Patent: Dec. 2, 2014

(54) DEVICE AND METHOD FOR EMBEDDING WATERMARK INTO IMAGE

(71) Applicants: Fu Tai Hua Industry (Shenzhen) Co., Ltd., Shenzhen (CN); Hon Hai Precision Industry Co., Ltd., New Taipei (TW)

(72) Inventors: Shih-Fang Wong, New Taipei (TW); Xin Lu, Shenzhen (CN); Yu-Kai Xiong, Shenzhen (CN); Hui-Feng Liu, Shenzhen (CN); Dong-Sheng Lv, Shenzhen (CN); Yu-Yong Zhang, Shenzhen (CN); Xin-Hua Li, Shenzhen (CN); Xiang-Lin Cheng, Shenzhen (CN); Jian-Lin Xiong, Shenzhen (CN); Xuan-Fen Huang, Shenzhen (CN); Jian-Jian Zhu, Shenzhen (CN); An-Lin Jiang, Shenzhen (CN); Xiao-Shan Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei ( * ) Notice: Subject to any disclaimer, the term of this patent is extended or adjusted under 35 U.S.C. 154(b) by 177 days.

(21) Appl. No.: 13/744,475

(22) Filed: Jan. 18, 2013

(65) Prior Publication Data
US 2013/0251190 A1   Sep. 26, 2013

(30) Foreign Application Priority Data
Mar. 20, 2012  (CN) .......................... 2012 1 0073990

(51) Int. Cl.
*G06K 9/36*       (2006.01)
*G06K 9/68*       (2006.01)
*G06T 1/00*       (2006.01)

(52) U.S. Cl.
CPC ............. *G06T 1/0021* (2013.01); *G06T 1/0028* (2013.01); *G06T 2201/0051* (2013.01); *G06T 2201/0061* (2013.01); *H04L 2209/608* (2013.01)
USPC .......................................... 382/232; 382/221

(58) Field of Classification Search
CPC ........... G07D 7/002; G06T 2201/0051; G06T 1/0028; G06T 2201/0061; G06T 1/005; G06T 2201/0203; H04N 1/3232; H04N 21/8358; B41M 3/10
USPC ......................................... 382/100, 221, 232
See application file for complete search history.

(56) References Cited

U.S. PATENT DOCUMENTS 7,245,740 B2 *   7/2007   Suzaki .......................... 382/100

\* cited by examiner

*Primary Examiner* — Amir Alavi
*Assistant Examiner* — Kenny Cese
(74) *Attorney, Agent, or Firm* — Novak Druce Connolly Bove + Quigg LLP

(57) ABSTRACT

A method of embedding a binary watermark into an image and a computer applied such are disclosed. The binary watermark is transformed to a watermark sequence consisting of K binary numbers and the image is converted into a grayscale image, being segmented into several sections. K sections are selected randomly while each selected section corresponds to one of the binary numbers of the watermark sequence. In relation to each selected section, a sum of a first part of the pixels and a sum of a second part of the pixels is compared. Each of the selected sections having their result of comparison being made to correspond to corresponding binary number in accordance with a predefined correlation results in the binary watermark being embedded into the image.

8 Claims, 2 Drawing Sheets

DEVICE AND METHOD FOR EMBEDDING WATERMARK INTO IMAGE

BACKGROUND

1. Technical Field

The present disclosure relates to a device and a method of embedding a watermark into an image, and particularly, to a device and a method of embedding a binary watermark into an image in spatial domain.

2. Description of Related Art

Piracy in relation to multimedia content is a serious issue. A digital watermark may protect multimedia content on the internet. However, the present technology of digital watermark embedding is usually based on DCT (Discrete cosine transform), which has the disadvantages of being complicated to embed and extract, and is too easy to be filtered out.

To avoid the above-mentioned disadvantages, a method of embedding binary watermark is required.

BRIEF DESCRIPTION OF THE DRAWINGS

The components in the drawings are not necessarily drawn to scale, the emphasis instead being placed upon clearly illustrating the principles of a device and a method of embedding a binary watermark into an image. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
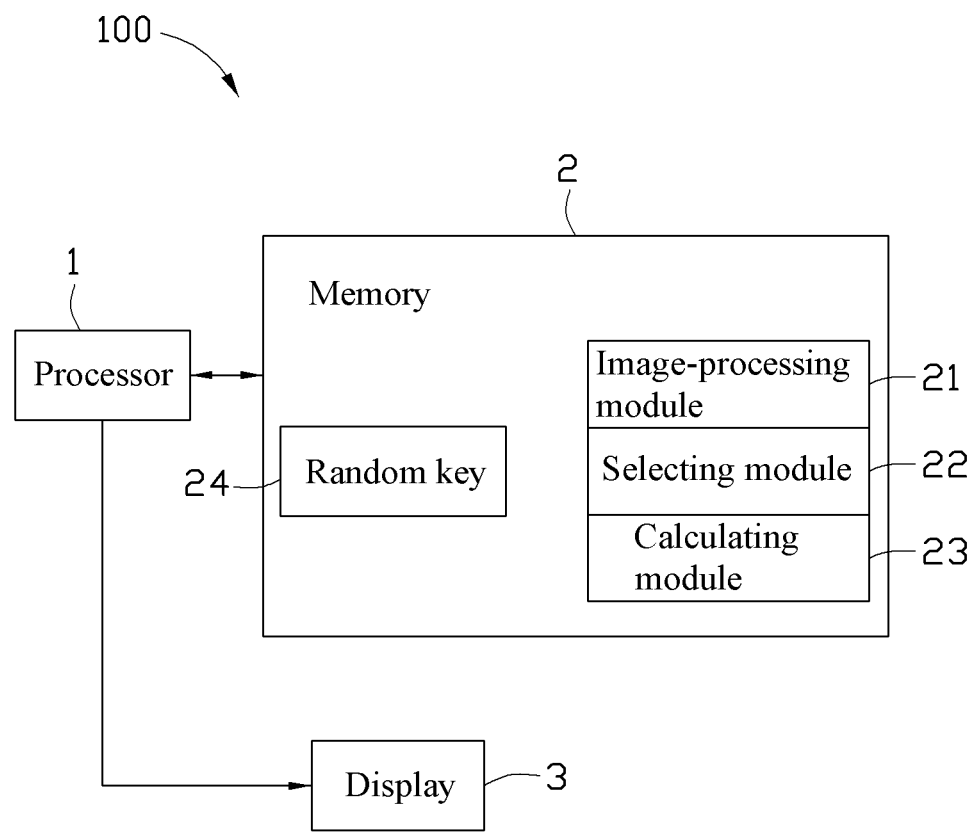
FIG. 1 is a block diagram of a device for embedding a binary watermark into an image in accordance with an exemplary embodiment.

FIG. 1 is a block diagram illustrating a computing device 100 capable of embedding a binary watermark into an image according to an exemplary embodiment of the present disclosure. The computing device 100 has a processor 1, a memory 2 and a display 3. The display 3 can be a cathode ray tube (CRT), a liquid crystal display (LCD), a plasma display, or a LED display. The memory 2 can be flash memory, a hard disk drive, or other non-transitory storage medium. The memory 2 stores one or more programs and several modules, wherein the modules are configured for execution by the programs, and the modules include an image-processing module 21, a selecting module 22 and a calculating module 23.

Although this diagram depicts components as functionally separate, such depiction is merely for illustrative purposes. It will be apparent to those skilled in the art that the components portrayed in the figures can be arbitrarily combined or divided into separate software, firmware and/or hardware components. Furthermore, it will also be apparent to those skilled in the art that such components, regardless of how they are combined or divided, can be executed on the same computing device or multiple computing devices, and the multiple computing devices can be connected and interconnected by one or more networks.

Figure 2:
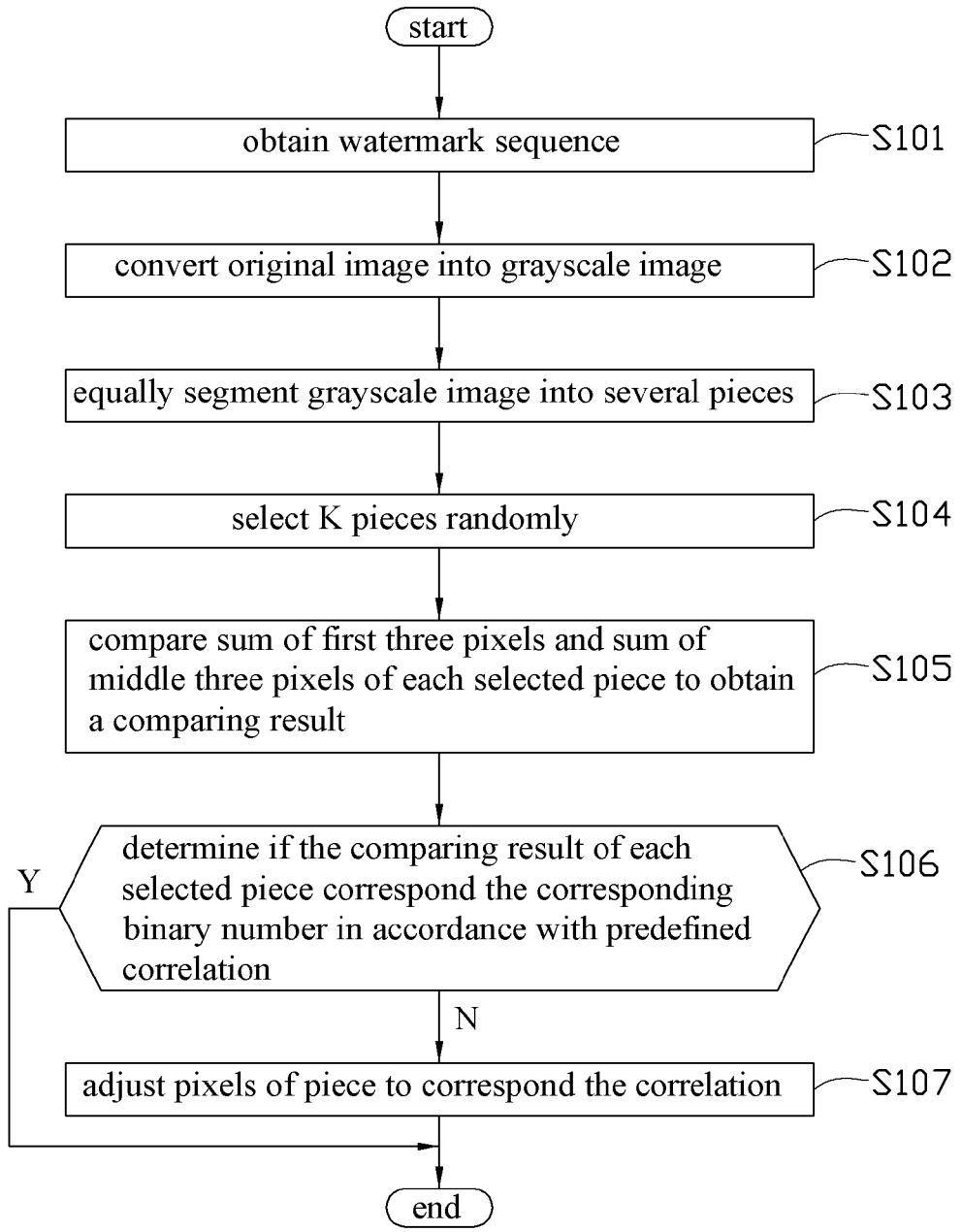
FIG. 2 is a flowchart of a method for embedding a binary watermark into an image in accordance with an exemplary embodiment.

FIG. 2 is a flowchart illustrating a method of embedding a binary watermark into an image according to an exemplary embodiment of the present disclosure. The method can be applied to the computing device 100. An image which the user wants to protect, and a watermark, are input into the computing device 100. The binary watermark has n×m=K pixels, and the image has N×M pixels. In this embodiment, the watermark is a bitmap object having a size of 32×32=1024 pixels, and the image is a RGB image having a size of 512×512 pixels.

In step S101, the processor 1 calculates the binary watermark by a descending dimension algorithm to obtain a one-dimensional watermark sequence. The watermark sequence consists of K binary numbers. In step S102, the image-processing module 21 converts the image into a grayscale image. The grayscale image can be converted from any one of the three quantities (R, G, B) of the original RGB image.

In step S103, the image-processing module 21 segments the grayscale image into a plurality of equal sections, which are ordered. In this embodiment, each of the sections has 3×3 pixels. In this way, the grayscale image is divided into N/3× M/3 sections. Moreover, in each of the sections, the pixels are in order and serial numbers $C_1, C_2 \ldots C_9$ are assigned to the pixels.

In step S104, the selecting module 22 generates a random key 24, and selects K sections randomly from the sections, while each of the selected sections corresponds to one of the binary numbers of the watermark sequence. The random key 24 is stored in the memory 2 after being generated.

In step S105, in each selected section, the calculating module 23 compares a sum of a first part of the pixels and a sum of a second part of the pixels to obtain a comparison. The first and the second parts of the pixels have the same number of pixels and there is no pixel repeated. The sum of the pixels means the addition of the gray scale values of the pixels. In this embodiment, in each selected section, the first part of pixels points to first three pixels of the ordered pixels with serial numbers $C_1, C_2, C_3$, while the second part of pixels points to the middle three pixels of the ordered pixels with serial numbers $C_4, C_5, C_6$. The comparison establishes the difference between the first three pixels and the middle three pixels. The result of the comparison can be represented as a value d, wherein $d=(C_1+C_2+C_3)-(C_4+C_5+C_6)$.

In step S106, the calculating module 23 determines if the result of the comparison in relation to each selected section corresponds to a corresponding binary number, in accordance with a predefined correlation. In this embodiment, the result of the comparison is $d=(C_1+C_2+C_3)-(C_4+C_5+C_6)$, the predefined correlation is set to be but not limited to that if the section corresponds to the binary number 0, the result should be bigger than or equal to a threshold, which is 0 in this embodiment. If the section corresponds to the binary number 1, the result thereof should be smaller than the threshold, which is 0 in this embodiment 1. For example, if a section corresponds to the binary number 1, but the comparison result of the section is not smaller than 0, the result of the section fails to correspond to the binary number 1 in accordance with the correlation.

In step S107, if the result of comparison in relation to the section does not correspond to the corresponding binary number in accordance with the correlation, the calculating module 23 adjusts the pixels of the section to make the result of the section correspond to the binary number in accordance with the correlation. For example, if a section corresponds to the binary number 1, the result of that section should be smaller than the threshold, in this embodiment. If the result of that section is smaller than 0, the pixels of the section are not adjusted. If the result of that section is not smaller than 0, the calculating module 23 sets a constant, which is a natural number, and respectively adds the d/3 and the constant to the middle three pixels $C_4$, $C_5$, $C_6$, therefore turning the result of that section into a result smaller than 0, so as to fit the correlation.

Therefore, all of the selected sections have their results corresponding to the corresponding binary number in accordance with the correlation. In this way, the binary watermark is embedded into the image, as the gray scale values of the pixels of the selected sections has been adjusted to make the calculation results of the gray scale values match the information of the binary watermark.

For subsequently extracting the binary watermark, first, the processor 1 retrieves the random key 24 from the memory 2 for retrieving the K selected sections from the image according to the random key 24. Second, in each selected section, the calculating module 23 compares a sum of a first part of the pixels and a sum of a second part of the pixels to obtain a comparison result.

Third, the calculating module 23 retrieves the binary watermark sequence according to the correlation of the result of comparison and the binary number. For example, if the result of a section is smaller than 0, according to the correlation, the binary number corresponding to the section is 1. Finally, the processor 1 reconstructs the binary watermark by calculating the watermark sequence and displays the binary watermark on the display 3.

The method of embedding watermark of the present disclosure is less complicated than that of related art and is more difficult to be filtered out.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A method of embedding binary watermark pixels into an image, the watermark has K pixels, the method comprising the steps of:
    obtaining a watermark sequence consisting of K binary numbers;
    converting the image into a grayscale image;
    segmenting the grayscale image into a plurality of equal sections;
    selecting K sections randomly, wherein each selected section corresponds to one of the K binary numbers of the watermark sequence;
    comparing a sum of a first part of the pixels of each selected section and a sum of a second part of the pixels of each selected section to obtain a comparison result of each selected section;
    determining if the comparison result of each selected section corresponds to the corresponding one of the K binary number in accordance with a predefined correlation; and
    adjusting the pixels of the section if the comparison result of the section does not correspond to the corresponding binary number in accordance with the predefined correlation.

2. The method according to claim 1, wherein the predefined correlation means if the section corresponds to the binary number 0, the comparison result of the section should be bigger than or equal to a predetermined value; and if the section corresponds to the binary number 1, the comparison result of the section should be smaller than the threshold.

3. The method according to claim 2, wherein the threshold is 0.

4. The method according to claim 1, wherein each selected section has 3×3 pixels, the first part of the pixels of each selected section is the first three pixels of each selected section, and the second part of the pixels of each selected section is the middle three pixels of each selected section.

5. A computer applied to embed K binary watermark pixels into an image, the computer comprising:
    a memory;
    one or more processors; and
    one or more modules stored in the memory and configured for execution by the one or more processors, the one or more modules including instructions to:
    obtain a watermark sequence consisting of K binary numbers;
    convert the image into a grayscale image;
    segment the grayscale image into a plurality of equal sections;
    select K sections randomly, wherein each selected section corresponds one of the binary numbers of the watermark sequence;
    compare a sum of a first part of the pixels of each selected section and a sum of a second part of the pixels of each selected section to obtain a comparison result of each selected section;
    determine if the comparison result of each selected section corresponds the corresponding binary number in accordance with a predefined correlation; and
    adjust the pixels of the section if the comparison result of the section does not correspond the corresponding binary number in accordance with the predefined correlation.

6. The computer according to claim 5, wherein the predefined correlation means if the section corresponds to the binary number 0, the comparison result of the section should be bigger than or equal to a predetermined value; and if the section corresponds to the binary number 1, the comparison result of the section should be smaller than the threshold.

7. The computer according to claim 6, wherein the threshold is 0.

8. The computer according to claim 5, wherein each selected section has 3×3 pixels, the first part of the pixels of each selected section is the first three pixels of each selected section, and the second part of the pixels of each selected section is the middle three pixels of each selected section.

* * * * *